(12) United States Patent
Norell

(10) Patent No.: US 11,358,115 B2
(45) Date of Patent: Jun. 14, 2022

(54) MULTI-CHANNEL DISTILLATION COLUMN PACKING

(71) Applicant: Norell, Inc., Morgantown, NC (US)

(72) Inventor: Gregory B. Norell, Morganton, NC (US)

(73) Assignee: Norell, Inc.

( * ) Notice: Subject to any disclaimer, the term of this patent is extended or adjusted under 35 U.S.C. 154(b) by 436 days.

(21) Appl. No.: 16/367,366

(22) Filed: Mar. 28, 2019

(65) Prior Publication Data

US 2019/0299189 A1   Oct. 3, 2019

Related U.S. Application Data

(60) Provisional application No. 62/649,393, filed on Mar. 28, 2018.

(51) Int. Cl.
*B01J 19/30* (2006.01)

(52) U.S. Cl.
CPC ...... *B01J 19/30* (2013.01); *B01J 2219/30223* (2013.01); *B01J 2219/30466* (2013.01); *B01J 2219/3188* (2013.01)

(58) Field of Classification Search
CPC .............. B01J 19/30; B01J 2219/30223; B01J 2219/312; B01J 2219/3188; B01D 3/32; B01D 3/28
See application file for complete search history.

(56) References Cited

U.S. PATENT DOCUMENTS

| | | | |
|---|---|---|---|
| 3,233,389 A | 2/1966 | Dahlen | |
| 3,796,657 A | 3/1974 | Pretourius et al. | |
| 4,981,621 A | 1/1991 | Puriyusu | |
| 5,073,236 A | 12/1991 | Gelbein | |
| 5,783,069 A * | 7/1998 | Frank | B01J 19/30 |
| | | | 210/150 |
| 7,032,894 B2 | 4/2006 | Adusei et al. | |
| 2002/0157537 A1 | 10/2002 | Hayashida et al. | |
| 2003/0160342 A1 | 8/2003 | Niknafs et al. | |
| 2004/0020238 A1 | 2/2004 | Kalbassi et al. | |

(Continued)

FOREIGN PATENT DOCUMENTS

| | | |
|---|---|---|
| CN | 1264616 A | 8/2000 |
| CN | 2855525 Y | 1/2007 |

(Continued)

OTHER PUBLICATIONS

Search Report from PCT/US2019/24498, dated Jun. 14, 2019, pp. 1-8.

(Continued)

*Primary Examiner* — Lessanework Seifu
(74) *Attorney, Agent, or Firm* — The Belles Group, P.C.

(57) ABSTRACT

Described herein is a column packing for a distillation apparatus, the column packing having an upper end opposite a lower end, the column packing comprising: a body extending along a central axis, the body comprising: a central channel extending parallel to the central axis, the central channel comprising a first open end opposite a second open end; and a plurality of perimeter channels circumscribing the central channel, each of the perimeter channels comprising a first open end opposite a second open end wherein the multi-channel body is formed of fluoropolymer.

16 Claims, 13 Drawing Sheets

(56) References Cited

U.S. PATENT DOCUMENTS

| | | | |
|---|---|---|---|
| 2007/0194471 A1 | 8/2007 | Nagaoka | |
| 2008/0181054 A1 | 7/2008 | Kojima | |
| 2009/0115077 A1 | 5/2009 | Niknafs et al. | |
| 2010/0209315 A1 | 8/2010 | Niknafs et al. | |
| 2011/0114288 A1 | 5/2011 | Miller | |
| 2019/0337823 A1* | 11/2019 | Leys | F16L 25/028 |

FOREIGN PATENT DOCUMENTS

| | | |
|---|---|---|
| CN | 202683224 U | 1/2013 |
| CN | 103418152 A | 12/2013 |
| CN | 104984723 A | 10/2015 |
| JP | S61178001 A | 8/1986 |
| JP | 2008501502 A | 1/2008 |
| WO | WO2006079240 A1 | 8/2006 |
| WO | WO 2016/185159 A1 | 11/2016 |
| WO | WO2016185159 A1 | 11/2016 |

OTHER PUBLICATIONS

*Fluoropolymer FEP Multi-Channel Distillation Column Packing*, Norell NMR Tubes, Mar. 7, 2017, pp. 1-2. https://nmrtubes.com/pdf/NORELL%20Column%20Packing%20Information%20Sheet.pdf., Fluoropolymer FEP Multi-Channel™ Distillation Column Packing; Retrieved Sep. 3, 2021, pp. 1-2.

\* cited by examiner

MULTI-CHANNEL DISTILLATION COLUMN PACKING

CROSS-REFERENCE TO RELATED APPLICATIONS

This application claims the benefit of U.S. Provisional Application No. 62/649,393, filed Mar. 28, 2018. The disclosure of the above application is incorporated herein by reference.

BACKGROUND

Distillation apparatus and techniques may utilize a column in which mass transfer or heat exchange between liquid and vapor streams occurs and, more particularly, to packing elements used in such columns to facilitate contact between the liquid and vapor streams. Many types of metallic or glass packings have been developed for use in mass transfer or heat exchange columns. In general, these packings facilitate contact between the liquid and vapor streams by causing more uniform distribution of liquid and vapor over the surface of the packing. Limitations, however, exist with the amount of surface area these packing elements may provide due to the cost of material and/or difficulty in fabricating parts. Thus, a need exists for a better distillation packing element.

BRIEF SUMMARY

The present invention is directed to a column packing for a distillation apparatus, the column packing comprising: a first open end opposite a second open end: a central channel; a plurality of perimeter channels; and a body extending along a central axis between an upper end opposite a lower end, the body formed of polymeric material and comprising: an outer wall extending substantially parallel to the central axis between the first and second open ends of the body; an inner wall circumscribed by the outer wall and extending substantially parallel to the central axis between the first and second open ends of the body; and a plurality of rib elements connecting the inner wall to the outer wall; wherein the central axis intersects both the first and second open ends, the central channel extending parallel to the central axis and the central channel circumscribed by the inner wall; and the plurality of perimeter channels extending parallel to the central axis, each of the plurality of perimeter channels defined by at least a portion of the inner wall, at least a portion of the outer wall, and at least two the plurality of rib elements.

Other embodiments of the present invention include a column packing for a distillation apparatus, the column packing having an upper end opposite a lower end, the column packing comprising: a body extending along a central axis, the body comprising: a central channel extending parallel to the central axis, the central channel comprising a first open end opposite a second open end; and a plurality of perimeter channels circumscribing the central channel, each of the perimeter channels comprising a first open end opposite a second open end wherein the multi-channel body is formed of fluoropolymer.

Other embodiments of the present invention include a distillation column comprising: at least one of the column packings previously discussed.

Other embodiments of the present invention include a method of distilling comprising: distilling a substance through the one of the previously discussed distillation column.

Other embodiments of the present invention include a method of forming a column packing for a distillation apparatus, the method comprising: a) extruding a composition comprising fluoropolymer through a die to form a tube having a central channel circumscribed by a plurality of perimeter channels; b) cutting the tube in a direction perpendicular to the central axis to form a body comprising the central channel and the plurality of perimeter channels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
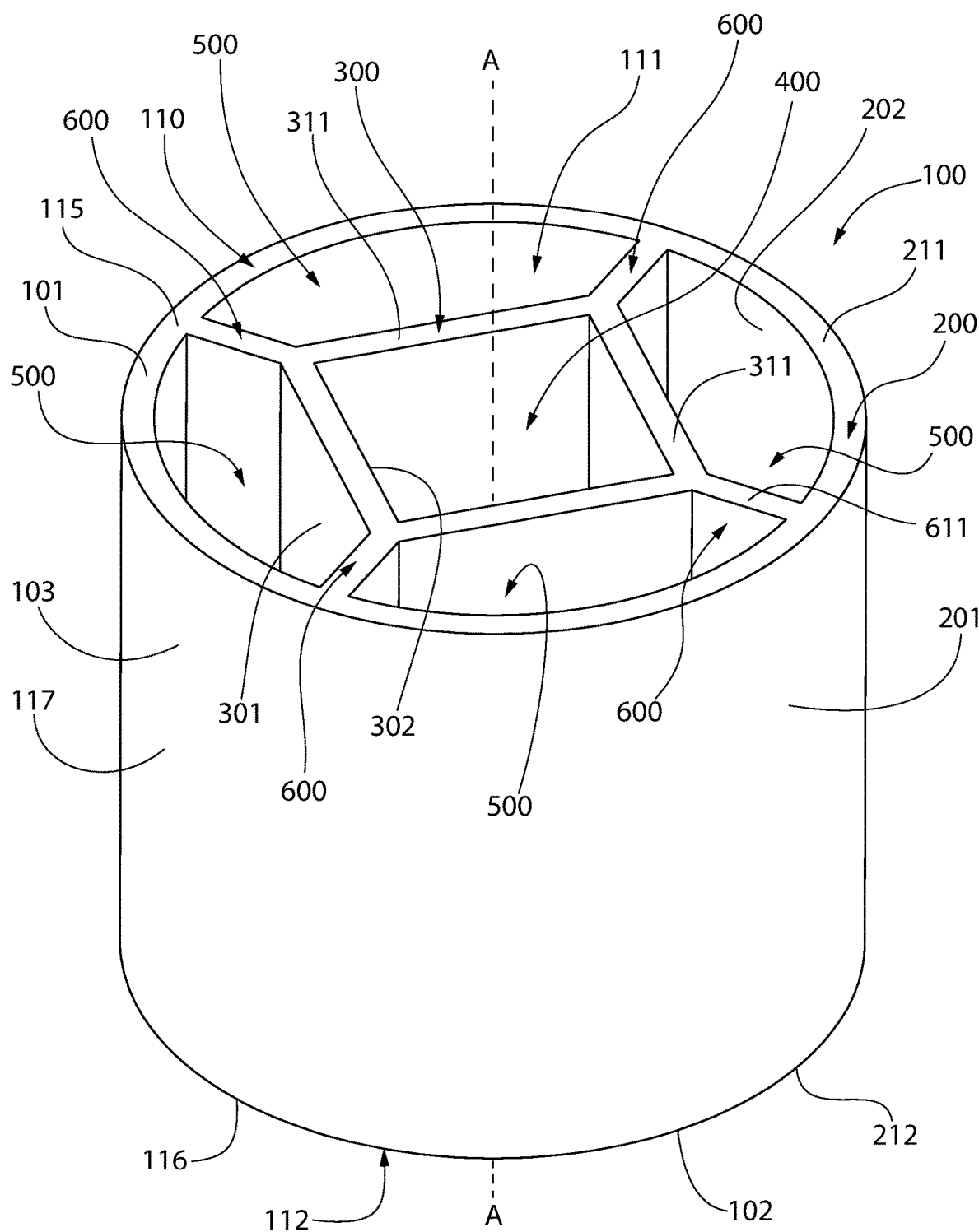
FIG. 1 is a top perspective view of a multi-channel distillation column according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Referring now to FIGS. 1, 2, 7, and 8—the present invention is directed to a distillation apparatus 1 comprising at least one column packing 100. The distillation apparatus 1 may comprise a distillation chamber 10 (also referred to as a "distillation column") having an inlet 11 and an outlet 12. The distillation apparatus 1 may further comprise one or more supports 20 that are located inside of the distillation chamber 10. The supports 20 may be a perforated layer. The distillation apparatus 1 may further comprise one or more of the column packings 100—preferably a plurality of the column packings 100. For the distillation apparatus 1 comprising a multiple supports 20, a plurality of the column packings 100 may be located on the multiple supports 20 inside of the distillation chamber 10.

The inlet 11 of the distillation chamber 10 may be fluidly coupled to a first reservoir and the outlet 12 of the distillation chamber 10 may be fluidly coupled to a second reservoir. The first reservoir may contain a composition that is delivered to the distillation chamber 10 via the inlet 11, whereby the composition is subjected to distillation—as discussed in further detail herein. After distillation, the distilled composition may exit the distillation chamber 10 and be delivered to the second reservoir via the outlet 12.

Figure 2:
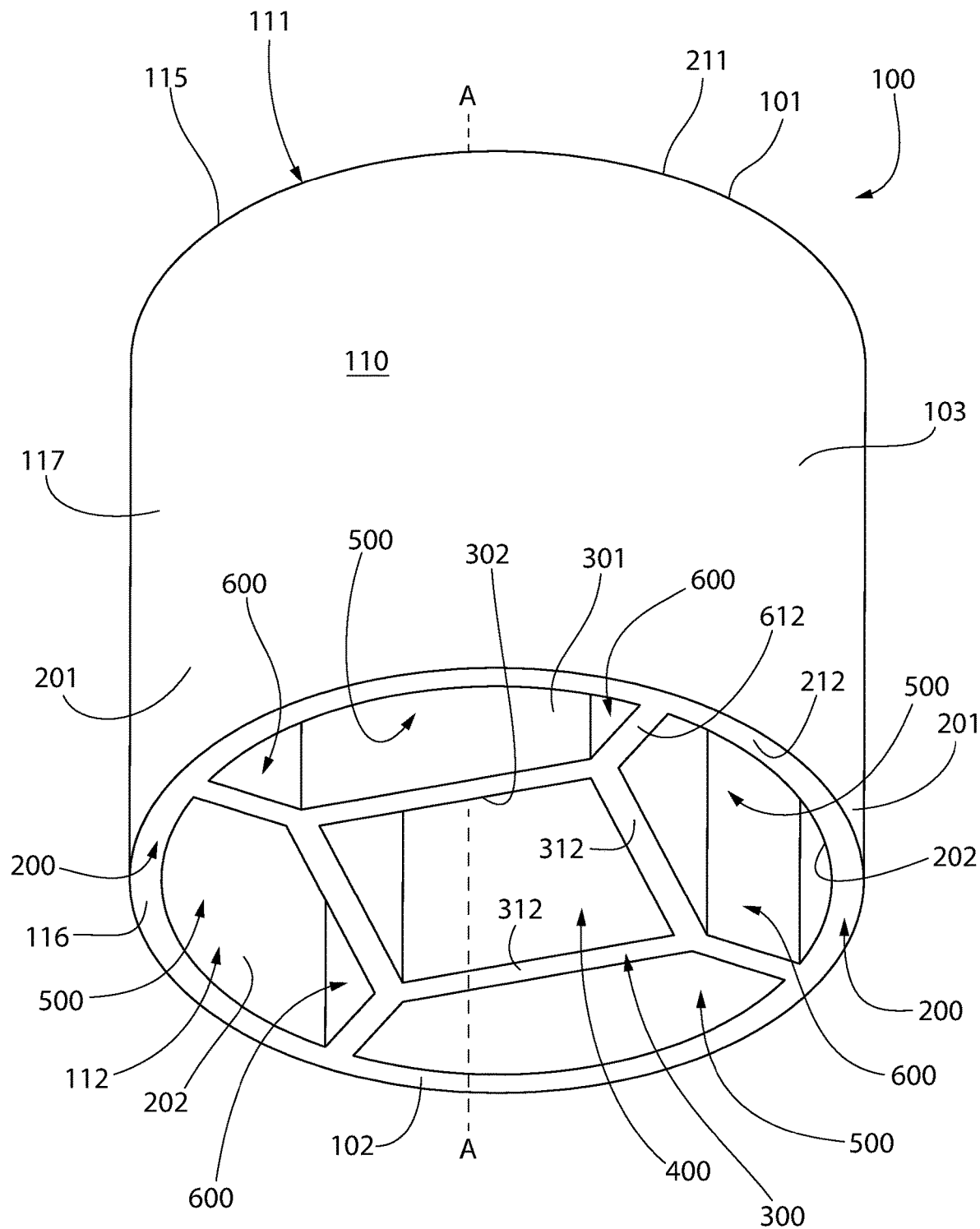
FIG. 2 is a bottom perspective view of the multi-channel distillation column of FIG. 1.
Figure 3:
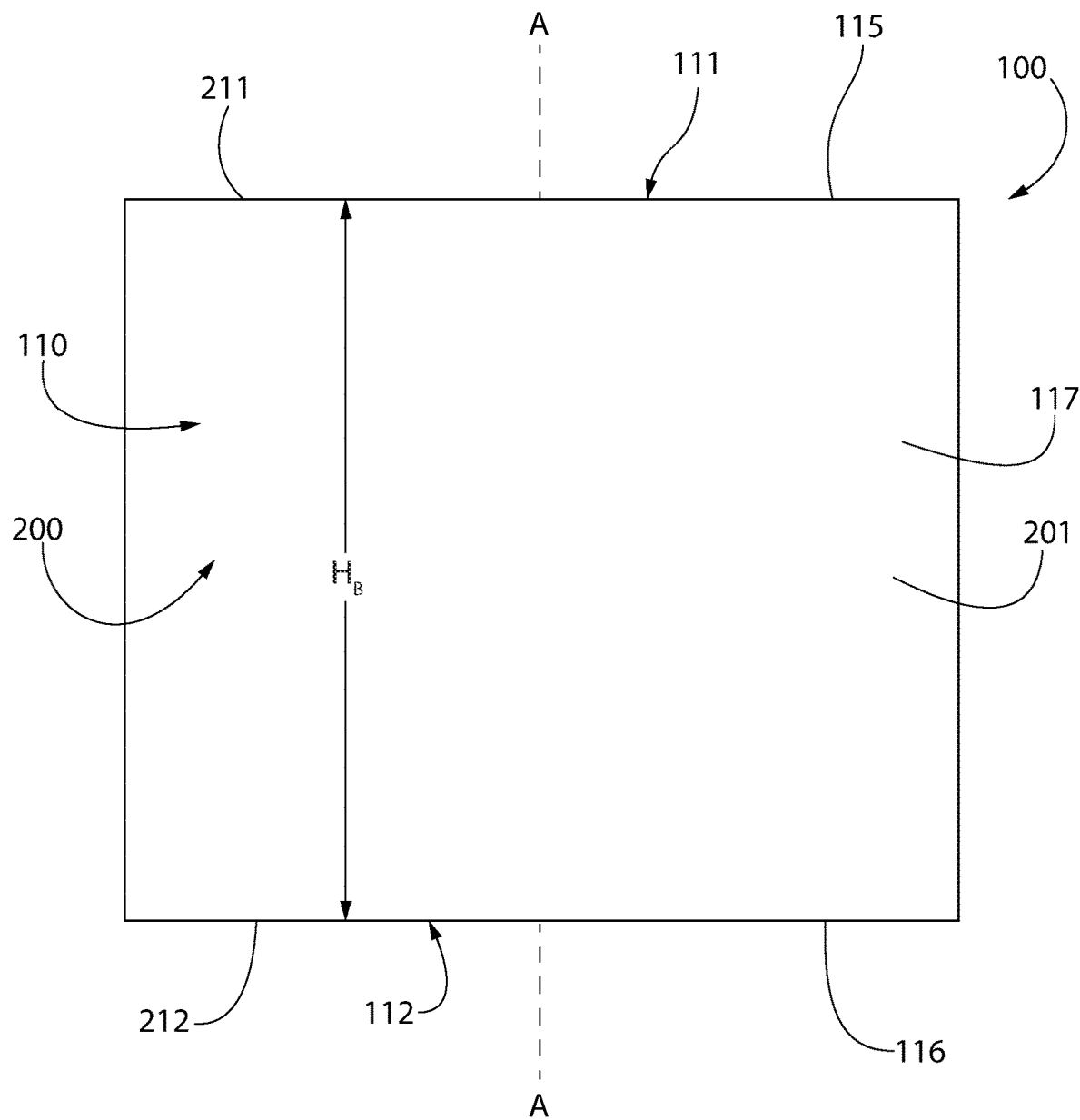
FIG. 3 is a side view of the multi-channel distillation column of FIG. 1.
Figure 4A:
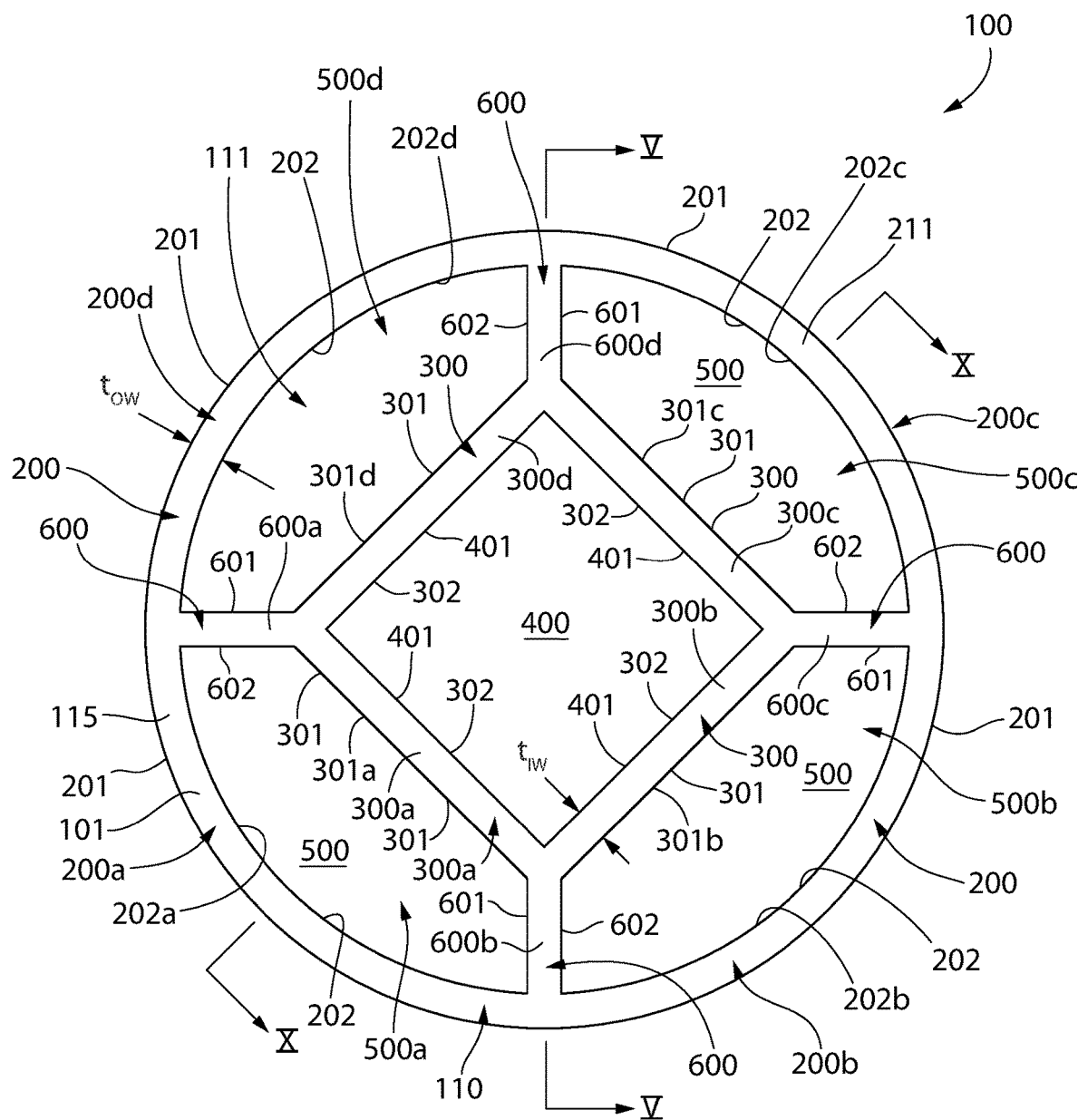
FIG. 4A is a top view of the multi-channel distillation column of FIG. 1.
Figure 4B:
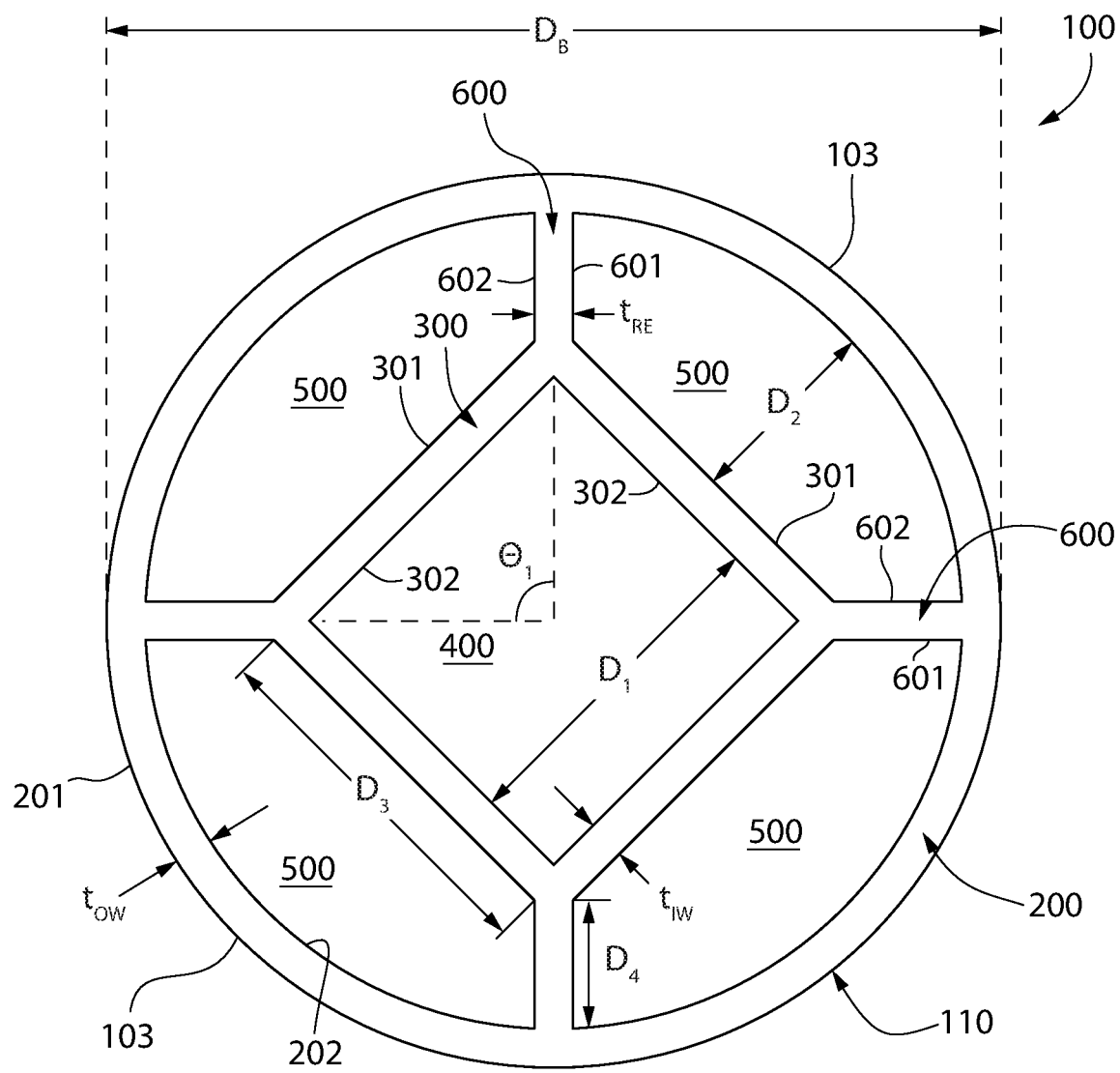
FIG. 4B is a top view of the multi-channel distillation column of FIG. 1.
Figure 5:
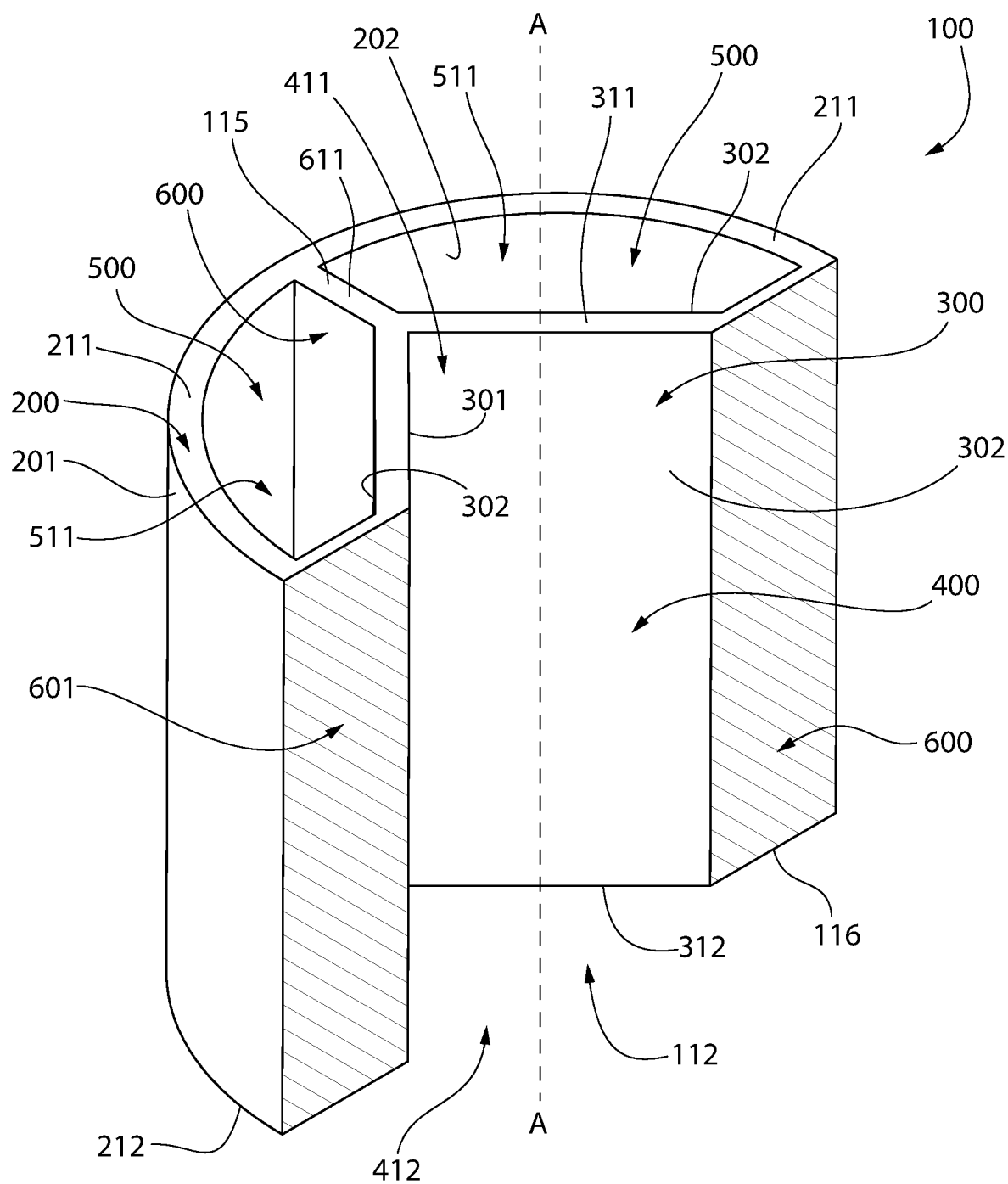
FIG. 5 is a cross-sectional view of the multi-channel distillation column along line V-V of FIG. 4.
Figure 6:
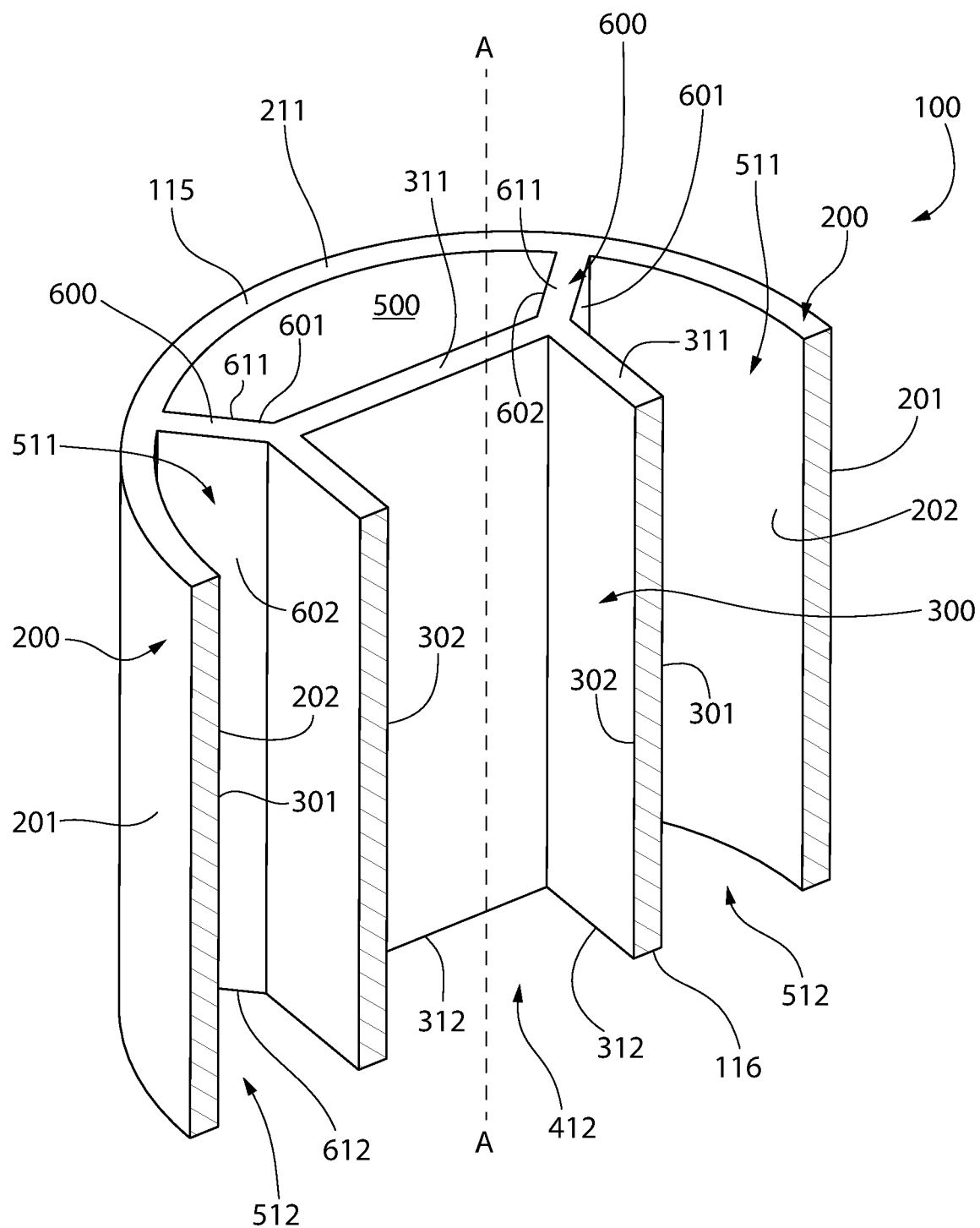
FIG. 6 is a cross-sectional view of the multi-channel distillation column along line X-X of FIG. 4.

Referring now to FIGS. 1-3, the column packing 100 of the present invention may comprise an uppermost surface 101 opposite a lowermost surface 102 and an exposed side surface 103 extending there-between.

The column packing 100 may comprise a body 110 extending along a central axis A-A. The body 110 may comprise an upper surface 115 opposite a lower surface 116 as well as a side surface 117 that extends between the upper surface 115 and the lower surface 116. The body 110 may be cylindrical in shape.

According to some embodiments of the present invention, the body 110 may comprise an outer wall 200, an inner wall 300, and one or more rib elements 300. During distillation, the combination of the outer wall 200, the inner wall 300, and one or more rib elements 300 may provide a contact surface area for the liquid and vapor phases to mix and reach thermal equilibrium during distillation—which results in efficient fractional distillation.

Having the available surface area within the column packing 100 being a function of the layout for the outer wall 200, the inner wall 300, and/or the rib elements 600 offers a dynamic ability to not only increase the amount of available surface area but also custom tailor a column packing 100 to suit unique distillation needs by modifying the overall shape of the body 110.

The body 110 may have a body height $H_B$ as measured by the distance between upper surface 115 and the lower surface 116. The body height $H_B$ may range from about 1 mm to about 80 mm—including all thickness and sub-ranges there-between. In a preferred embodiment, the body height $H_B$ may range from about 4 mm to about 6 mm—including all thickness and sub-ranges there-between.

The body 110 may have a body diameter $D_B$ as measured by the distance between opposing side surfaces 117 across the central axis A-A. The body diameter $D_B$ may range from about 1 mm to about 20 mm—including all thickness and sub-ranges there-between. In some embodiments, the body diameter $D_B$ may range from about 2 mm to about 18 mm—including all thickness and sub-ranges there-between. In some embodiments, the body diameter $D_B$ may range from about 3 mm to about 16 mm—including all thickness and sub-ranges there-between. In some embodiments, the body diameter $D_B$ may range from about 4 mm to about 14 mm—including all thickness and sub-ranges there-between. In some embodiments, the body diameter $D_B$ may range from about 4 mm to about 12 mm—including all thickness and sub-ranges there-between. In some embodiments, the body diameter $D_B$ may range from about 5 mm to about 10 mm—including all thickness and sub-ranges there-between. In some embodiments, the body diameter $D_B$ may range from about 5 mm to about 8 mm—including all thickness and sub-ranges there-between. In some embodiments, the body diameter $D_B$ may range from about 4 mm to about 6 mm—including all thickness and sub-ranges there-between. In some embodiments, the body diameter $D_B$ may be about 5 mm.

A ratio of the body diameter $D_B$ to the body height $H_B$ may range from about 0.25:1 to about 4:1—including all ratios and sub-ranges there-between. In some embodiments, the ratio of the body diameter $D_B$ to the body height $H_B$ may range from about 0.33:1 to about 3:1—including all ratios and sub-ranges there-between. In some embodiments, the ratio of the body diameter $D_B$ to the body height $H_B$ may range from about 0.5:1 to about 2:1—including all ratios and sub-ranges there-between. In some embodiments, the ratio of the body diameter $D_B$ to the body height $H_B$ may range from about 0.75:1 to about 1.25:1—including all ratios and sub-ranges there-between. In a preferred embodiment, the ratio of the body diameter $D_B$ to the body height $H_B$ may be about 1:1.

According to the present invention, having the ratio of the body diameter $D_B$ to the body height $H_B$ may range from about 0.75:1 to about 1.25:1 may produce a more uniform shape of the body 110. The more uniform shape of the body 110 may promote a randomly oriented distribution as the column packing 100 if it is poured or "dumped" into the distillation column 10. Random column packing orientation exposes the maximum amount of surface area and permits the highest vapor throughput rate, while simultaneously minimizing unwanted effects within a functioning distillation column such as "flooding" or "channeling".

The random column packing may result in a stack of a plurality of column packings that extend to a stacking height. The stacking height may be equal to at least about 1.1 times the body height $H_B$. In some embodiments, the stacking height may be equal to at least about 1.5× times the body height $H_B$. The stacking height may be equal to at least about 1.5× times the body height $H_B$. The stacking height may be equal to at least about 2× times the body height $H_B$.

Column packing 100 having a body 110 having a ratio of the body diameter $D_B$ to the body height $H_B$ that is less than 0.2:1 may result in long length column packings 10 that tend to fall into a mostly horizontal, closely packed pattern that can impede the flow of liquid and vapor phases within the distillation column 10, leading to a flooding condition when the downward return flow of the liquid phase is slowed or blocked. Flooding greatly diminishes the efficiency and vapor throughput rate of a distillation process.

Column packing 100 having a body 110 having a ratio of the body diameter $D_B$ to the body height $H_B$ that is less than 0.2:1 may result in long length column packings 10 that can also create jams that pack unevenly, causing voids having no packing within the distillation column. This not only directly reduces distillation column efficiency, but contributes to the condition known as channeling, wherein the downward return flow of the liquid phase follows a narrow path that mixes poorly with the upward vapor phase flow, thereby destroying the necessary equilibration between liquid and vapor phases.

The upper surface 115 of the body 110 may form the uppermost surface 101 of the column packing 100. Stated otherwise, the uppermost surface 101 of the column packing 100 may comprise the upper surface 115 of the body 110. The lower surface 116 of the body 110 may form the lowermost surface 102 of the column packing 100. Stated otherwise, the lowermost surface 102 of the column packing 100 may comprise the lower surface 116 of the body 110. The side surface 117 of the body 110 may form the exposed side surface 103 of the column packing 100. Stated otherwise, the exposed side surface 103 of the column packing 100 may comprise the side surface 117 of the body 110.

The body 110 may be open-ended. The body 110 may comprise a first open-end 111 opposite a second open-end 112. Each of the first open-end 111 and the second open-end 112 may intersect the central axis A-A. The first open-end 111 and the upper surface 115 of the body 110 may overlap. The second open-end 112 and the lower surface 116 of the body 110 may overlap.

As discussed in greater detail herein, the column packing 100 may comprise a plurality of channels 400, 500 that extend through the body 110. Specifically, the column packing 100 may comprise a plurality of channels 400, 500 that extend between the first open-end 111 and the second open-end 112 of the body 110. The plurality of channels 400, 500 may provide fluid communication through the body 110 between uppermost surface 101 and the lowermost surface 102 of the column packing 100. The plurality of channels 400, 500 may provide fluid communication through the body 110 such that fluid communication may exist between the first open-end 111 and the second open-end 112 of the body 110.

The plurality of channels of the column packing 100 may comprise a central channel 400 and at least one perimeter channel 500. In some embodiments, the column packing 100 may comprise a central channel 400 and a plurality of perimeter channels 500. The central channel 400 may be circumscribed by the perimeter channels 500.

Referring now to FIGS. 4A, 4B, 5, and 6, the central channel 400 may extend along a direction substantially parallel to the central axis A-A. The central channel 400 may be concentric with the central axis A-A. The central channel 400 may have a uniform cross-sectional shape taken along a direction that is perpendicular to the central axis A-A. The cross-sectional shape of the central channel 400 may be circular. In other embodiments, the cross-sectional shape of the central channel 400 may be polygonal. Non-limiting examples of polygonal cross-sectional shapes include quadrilateral (square, rectangle, diamond, trapezoid), pentagonal, hexagonal, heptagonal, octagonal, nonagonal, decagonal, etc.

The central channel 400 may comprise a first open-end 411 opposite a second open-end 412. The first open-end 411 and the second open-end 412 of the central channel 400 may intersect the central axis A-A. The first open-end 411 of the central channel 400 may overlap with the upper surface 115 of the body 110. The second open-end 412 of the central channel 400 may overlap with the lower surface 116 of the body 110.

The perimeter channels 500 may extend along a direction that is substantially parallel to the central axis A-A. The perimeter channels 500 may circumscribe the central axis A-A. The perimeter channels 500 can be oriented concentrically about the central axis A-A. In some embodiments, the column packing 500 may comprise two, three, four, five, six, seven, eight, nine, ten individuals perimeter channels 500.

Each of the perimeter channels 500 may have a cross-sectional shape taken along a direction that is perpendicular to the central axis A-A. Each of the perimeter channels 500 may have the same cross-sectional shape. In other embodiments, each of the perimeter channels 500 may have different cross-sectional shapes. In some embodiments, a first plurality of the perimeter channels 500 may have a first cross-sectional shape and a second plurality of perimeter channels 500 may have a second cross-sectional shape—whereby the first and second cross-sectional shapes are different.

Each of the plurality of perimeter channels 500 may be oriented symmetrically about the central axis A-A such that each of the perimeter channels 500 are separated from each other by an equal distance. In other embodiments, the plurality of perimeter channels 500 may be oriented asymmetrically about the central axis A-A such that at least two of the perimeter channels 500 are separated from each other by non-equal distance.

Each of the perimeter channels 500 may comprise a first open-end 511 opposite a second open-end 512. The first open-end 411 of each perimeter channel 500 may overlap with the upper surface 115 of the body 110. The second open-end 412 of each perimeter channel 500 may overlap with the lower surface 116 of the body 110.

Referring now to FIGS. 1, 2, 4A, 4B, the body 110 of the column packing 100 may comprise an outer wall 200 and an inner wall 300. The outer wall 200 may circumscribe the inner wall 300. As discussed in greater detail herein, the outer wall 200 may be connected to the inner wall 300 by one or more rib elements 600 extending there-between.

The outer wall 200 may comprise an outer surface 201 opposite an inner surface 202. The inner surface 202 of the outer wall 200 may face the central axis A-A. The outer surface 201 of the outer wall 200 may face away from central axis A-A. The outer wall 200 may have an outer wall thickness tow as measured by the distance between the inner surface 201 and the outer surface 202 of the outer wall 200. The outer wall thickness tow may range from about 0.1 mm to about 0.3 mm—including all thickness and sub-ranges there-between. In some embodiments, the outer wall thickness tow may range from about 0.15 mm to about 0.25 mm—including all thickness and sub-ranges there-between. In some embodiments, the outer wall thickness tow may be about 0.2 mm. The outer wall thickness tow may be substantially uniform.

The outer surface 201 of the outer wall 200 may form the side surface 117 of the body 110. Stated otherwise, the side surface 117 of the body 110 may comprise the outer surface 201 of the outer wall 200

The outer wall 200 may have an upper edge 211 opposite a lower edge 212. The outer wall 200 may extend between the upper edge 211 and the lower edge 212 in a direction that is substantially parallel to the central axis A-A. The outer wall 200 may extend continuously between the upper edge 211 and the lower edge 212 such that the outer wall 200 is substantially free of passageways extending between the inner surface 202 and the outer surface 201 of the outer wall 200.

The upper edge 211 of the outer wall 200 may form at least a portion of the upper surface 115 of the body 110. Stated otherwise, the upper surface of the body 110 may comprise upper surface 211 of the outer wall 200 most surface 101 of the column packing 100 may comprise the upper surface 115 of the body 110. The lower surface 116 of the body 110 may form the lowermost surface 102 of the column packing 100. The outer wall 200 may have a height as measured between the upper edge 211 and the lower edge 212 that is substantially equal to the body height $H_B$ of the body 110. The outer wall 200 may have a diameter as measured between opposite outer surfaces 201 of the outer wall 200 passing through the central axis A-A, whereby the diameter of the outer wall 200 may be substantially equal to the body diameter $D_B$ of the body 110.

The body 110 may comprise an inner wall 300. The inner wall 300 may comprise an outer surface 301 opposite an inner surface 302. The inner surface 302 of the inner wall 300 may face the central axis A-A. The outer surface 301 of the inner wall 300 may face away from central axis A-A. The inner wall 300 may have an inner wall thickness $t_{IW}$ as measured by the distance between the inner surface 301 and the outer surface 302 of the inner wall 300. The inner wall thickness $t_{IW}$ may range from about 0.1 to about 0.3—including all thickness and sub-ranges there-between. In some embodiments, the inner wall thickness $t_{IW}$ may range from about 0.15 to about 0.25—including all thickness and sub-ranges there-between. In some embodiments, the inner wall thickness $t_{IW}$ may be about 0.2. The inner wall thickness $t_{IW}$ may be substantially uniform.

The inner wall 300 may have an upper edge 311 opposite a lower edge 312. The inner wall 300 may extend between the upper edge 311 and the lower edge 312 in a direction that is substantially parallel to the central axis A-A. The outer wall 300 may extend continuously between the upper edge 311 and the lower edge 312 such that the inner wall 300 is substantially free of passageways extending between the inner surface 302 and the outer surface 301 of the inner wall 300.

The upper edge 311 of the inner wall 300 may form at least a portion of the upper surface 115 of the body 110. Stated otherwise, the upper surface 115 of the body 110 may comprise upper edge 311 of the inner wall 300. The lower edge 312 of the inner wall 300 may form at least a portion of the lower surface 116 of the body 110. Stated otherwise, the lower surface 116 of the body 110 may comprise the lower edge 312 of the inner wall 300.

Referring now to FIGS. 1, 2, and 4A-6, the body 110 may comprise one or more rib elements 600. In a preferred embodiment, the body 100 comprises a plurality of rib elements 600. Each of the rib elements 600 may extend from the inner wall 300 to the outer wall 200. In a preferred embodiment, each of the rib elements 600 may be integrally formed with the inner wall 300. In a preferred embodiment, each of the rib elements 600 may be integrally formed with the outer wall 200. The rib elements 600 may extend from the outer surface 301 of the inner wall 300 to the inner surface 202 of the outer wall 200.

Each of the rib elements 600 may be an elongated structure that extends in a direction parallel to the central axis A-A. The rib elements 600 may comprise a first major surface 601 opposite a second major surface 602. Each of the rib elements 600 may comprise an upper edge 611 opposite a lower edge 612. The first and second major surfaces 601, 602 of each rib element 600 may extend between the upper edge 611 and the lower edge 612 of the corresponding rib element 600.

The first major surface 601 of the rib element 600 may extend between the upper and lower edges 611, 612 in a direction that is substantially parallel to the central axis A-A. The second major surface 602 of the rib element 600 may extend between the upper and lower edges 611, 612 in a direction that is substantially parallel to the central axis A-A. The rib element 600 may extend continuously between the upper edge 611 and the lower edge 612 such that each of the rib elements 600 are substantially free of passageways extending between the first and second major surfaces 601, 602 of the rib element 600.

Each of the rib elements 300 may be oriented substantially radially about the central axis A-A. In other embodiments, the rib elements 300 may be arranged about the central axis A-A in a non-radially configuration. The plurality of the rib elements 300 may be symmetrically oriented about the central axis A-A. In other embodiments, the plurality of the rib elements 300 may be asymmetrically oriented about the central axis A-A.

Each of the rib elements 600 may be offset from each other about the central axis A-A by an offset angle $\theta_1$ that ranges from about 30° to about 180°—including all angles and sub-ranges there-between. The offset angle $\theta_1$ may relate to the number of rib elements 600 that form the body 110. For instance, the offset angle $\theta_1$ may be calculated by dividing 360° by the total number of rib elements 600. In a non-limiting example, the offset angle $\theta_1$ may be about 30°, about 40°, about 45°, about 51°, about 60°, about 72°, about 90°, about 120°, or about 180°.

Each of the rib elements 600 may have a rib element thickness $t_{RE}$ as measured by the distance between the first major surface 601 and the second major surface 602 of the rib element 600. The rib element thickness $t_{RE}$ may range from about 0.1 mm to about 0.3 mm—including all thickness and sub-ranges there-between. In some embodiments, the rib element thickness $t_{RE}$ may range from about 0.15 mm to about 0.25 mm—including all thickness and sub-ranges there-between. In some embodiments, the rib element thickness $t_{RE}$ may be about 0.2 mm. The rib element thickness $t_{RE}$ may be substantially uniform.

The upper edge 611 of the rib element 600 may form at least a portion of the upper surface 115 of the body 110. Stated otherwise, the upper surface 115 of the body 110 may comprise upper edge 611 of the rib element 600. The lower edge 612 of the rib element 600 may form at least a portion of the lower surface 116 of the body 110. Stated otherwise, the lower surface 116 of the body 110 may comprise the lower edge 612 of the rib element 600.

The inner wall 300 may form a closed geometry about the central axis A-A. Therefore, the inner wall 300 may form a perimeter that defines the central channel 400. Specifically, the inner surface 302 of the inner wall 300 may form a continuous surface about the central axis A-A, thereby defining a perimeter surface that forms the boundary of the central channel 400. As a result, the geometry of the inner wall 300 may control the cross-sectional geometry of the central channel 400.

The central channel 400 may have a length that is substantially equal to the body height $H_B$ of the body 110. The central channel 400 may have a first width (also referred to as a "first diameter") $D_1$ as measured between opposite inner surfaces 302 of the inner wall 300 in a direction substantially perpendicular to the central axis A-A. The first diameter D1 may range from about 1.6 mm to about 2.2 mm—including all thickness and sub-ranges there-between. In some embodiments, the first diameter D1 may range from about 1.7 mm to about 2.1 mm—including all thickness and sub-ranges there-between. In some embodiments, the first diameter D1 may range from about 1.8 mm to about 2.0 mm—including all thickness and sub-ranges there-between. In some embodiments, the first diameter D1 may be about 1.9 mm.

In a non-limiting example, the inner wall 300 may form a polygonal shape—such as an elongated square tube shape—resulting in the central channel 400 having a square cross-sectional shape. In another non-limiting example, the inner wall 300 may form a cylindrical shape, resulting in the central channel 400 having a circular cross-sectional shape.

The outer wall 200 may form a closed geometry about the central axis A-A. The combination of the inner wall 300, the outer wall 200, and one or more of the rib elements 600 may define each of the perimeter channels 500. Specifically, a portion of the inner surface 202 of the outer wall 200, a portion of the outer surface 301 of the inner wall 300, a first major surface of a first rib element 600, and a second major surface of a second rib element 600 may define a boundary that defines each of the perimeter channels 500. As a result, the geometry of the inner wall 300, the geometry of the outer wall 200 and/or the geometry of each of the rib elements 600 may control the cross-sectional geometry of the perimeter channels 500. In a non-limiting example, the inner wall 300 may form a polygonal shape—such as an elongated square tube shape—while the outer wall 200 forms a circular shape—resulting in the perimeter channels 500 having a cross-sectional shape that comprises both linear straight edges as well as curved edges.

The perimeter channels 500 may have a length as measured along a direction substantially a parallel to the central axis A-A, wherein the length of the perimeter channels 500 are substantially equal to the body height $H_B$ of the body 110.

The perimeter channels 500 may have a width as measured by a distance $D_2$ taken radially from the central axis A-A, the distance $D_2$ being measured between the outer surfaces 301 of the inner wall 300 and the inner surface 202 of the outer wall 200. The second distance $D_2$ may range from about 1.0 mm to about 1.3 mm—including all thickness and sub-ranges there-between. In some embodiments, the second distance $D_2$ may range from about 1.05 mm to about 1.25 mm—including all thickness and sub-ranges there-between. In some embodiments, the second distance $D_2$ may range from about 1.1 mm to about 1.2 mm—including all thickness and sub-ranges there-between. In some embodiments, the second distance $D_2$ may be about 1.15 mm.

The inner boundary of each of the perimeter channels 500 may span a distance $D_3$ as measured between opposite side boundaries (i.e., between opposite first and second major surfaces 601, 602 of the first and second rib elements 600) along the outer surface 301 of the inner wall. The distance $D_3$ of the inner boundary of the perimeter channel 500 may range from about 2.0 mm to about 2.6 mm—including all thickness and sub-ranges there-between. In some embodiments, the distance $D_3$ of the inner boundary of the perimeter channel 500 may range from about 2.1 mm to about 2.5 mm—including all thickness and sub-ranges there-between. In some embodiments, the distance $D_3$ of the inner boundary of the perimeter channel 500 may range from about 2.2 mm to about 2.4 mm—including all thickness and sub-ranges there-between. In some embodiments, the distance $D_3$ of the inner boundary of the perimeter channel 500 may be about 2.3 mm.

In a non-limiting example, FIGS. 1-6 demonstrate a column packing 100 that comprises a body 110 having a central channel 400 and a plurality of perimeter channels 500 that include a first perimeter channel 500a, a second perimeter channel 500b, a third perimeter channel 500c, and a fourth perimeter channel 500d. The four perimeter channels 500a, 500b, 500c, 500d, may be arranged concentrically about the central axis A-A and all have the same cross-sectional shape.

Each of the perimeter channels 500a, 500b, 500c, 500d, may comprise an inner boundary formed by a portion of the outer surface 301 of the inner wall 300, an outer boundary formed by a portion of the inner surface 202 of the outer wall 200, and a side boundary formed by a first major surface 601 of a first rib element 600 and a second major surface of a second rib element 600. The portion of the outer surface 301 of the inner wall 300, the portion of the inner surface 202 of the outer wall 200, the first major surface 601 of the first rib element 600, and the second major surface of the second rib element 600 may intersect each other to collectively form a closed perimeter defining the respective perimeter channels 500a, 500b, 500c, 500d.

A first perimeter channel 500a may comprise an inner boundary formed by a first portion of the outer surface 301a of the inner wall 300 that intersects a first side boundary formed by a second major surface 602 of a first rib element 600a, which intersects an outer boundary formed by a first portion of the inner surface 202a of the outer wall 200, which intersects a second side boundary formed by a first major surface 601 of a second rib element 600b, which intersects the inner boundary formed by the first portion of the outer surface 301a of the inner wall 300—thereby collectively forming a closed perimeter that defines the first perimeter channel 500a.

A second perimeter channel 500b may comprise an inner boundary formed by a second portion of the outer surface 301b of the inner wall 300 that intersects a first side boundary formed by a second major surface 602 of the second rib element 600b, which intersects an outer boundary formed by a second portion of the inner surface 202b of the outer wall 200, which intersects a second side boundary formed by a first major surface 601 of a third rib element 600c, which intersects the inner boundary formed by the second portion of the outer surface 301b of the inner wall 300—thereby collectively forming a closed perimeter that defines the second perimeter channel 500b.

A third perimeter channel 500c may comprise an inner boundary formed by a third portion of the outer surface 301c of the inner wall 300 that intersects a first side boundary formed by a second major surface 602 of the third rib element 600c, which intersects an outer boundary formed by a third portion of the inner surface 202c of the outer wall 200, which intersects a second side boundary formed by a first major surface 601 of a fourth rib element 600d, which intersects the inner boundary formed by the third portion of the outer surface 301c of the inner wall 300—thereby collectively forming a closed perimeter that defines the third perimeter channel 500c.

A fourth perimeter channel 500d may comprise an inner boundary formed by a fourth portion of the outer surface 301d of the inner wall 300 that intersects a first side boundary formed by a second major surface 602 of the fourth rib element 600d, which intersects an outer boundary formed by a fourth portion of the inner surface 202d of the outer wall 200, which intersects a second side boundary formed by a first major surface 601 of a first rib element 600a, which intersects the inner boundary formed by the fourth portion of the outer surface 301d of the inner wall 300—thereby collectively forming a closed perimeter that defines the fourth perimeter channel 500d.

According to this embodiment, each of the first, second, third, and fourth portions of the outer surfaces 301a, 301b, 301c, 301d of the inner wall 300 may be planar. Therefore, the respective inner boundaries of the first, second, third, and fourth respective perimeter channels 500a, 500b, 500c, 500d may be flat (i.e., planar). According to this embodiment, each of the first, second, third, and fourth portions of the inner surfaces 202a, 202b, 202c, 202d of the outer wall 200 may be curved—specifically, have a uniform radius of curvature as measured from the central axis A-A. Therefore, the respective outer boundaries of the first, second, third, and fourth respective perimeter channels 500a, 500b, 500c, 500d may be curved and have a uniform radius of curvature as measured from the central axis A-A. According to this embodiment, each of first and second major surfaces 601, 602, of the first, second, third, and fourth rib elements 600a, 600b, 600c, 600d may be planar—i.e., flat. Therefore, the respective first and second side boundaries of the first, second, third, and fourth respective perimeter channels 500a, 500b, 500c, 500d may be planar—i.e., flat.

The body 110 of the column packing may be formed from a polymeric material. The body 110 may consist essentially of the polymeric material. In some embodiments, the body 110 may consist of the polymeric material.

The polymeric material may be selected from materials that exhibit chemical resistance, stability, and purity. The polymeric material may be thermoplastic. The polymeric material may be suitable for hot-melt extrusion.

The polymeric material may be a polyolefin, polyvinyl chloride, or a fluoropolymer. Non-limiting examples of polyolefin include low or high-density polyethylene (LDPE or HDPE) polypropylene (PP).

In a preferred embodiment, the polymeric material may be a fluoropolymer. Non-limiting examples of fluoropolymer include FEP (Fluorinated Ethylene-Propylene, a copolymer of tetrafluoroethylene and hexafluoropropylene), PFA (PerFluoroAlkoxy, a copolymer of tetrafluoroethylene and a perfluoroether)—both high-purity PFA and standard purity PFA, PVDF (Poly Vinylidene Fluoride), ETFE (Ethylene-Tetrafluoroethylene copolymer), and combinations thereof.

Fluoropolymers, including FEP and PFA, exhibit chemical resistance to almost all but the most corrosive or reactive chemical compounds and conditions, such as intimate contact with a molten alkali metal (i.e., lithium, sodium or potassium) chlorine trifluoride, oxygen difluoride and liquid or gaseous elemental fluorine, to name the most significant ones.

With the chemical resistance, column packing 10 made from fluoropolymers offer extreme inertness and long service life, and so are ideal for contact with virtually all solvents and chemical compounds, even at the elevated temperatures encountered in most distillations.

In addition to extreme chemical resistance, fluoropolymers also withstand much higher continuous use service temperatures than the much more inexpensive and commonly used thermoplastic polymers noted previously. The following table summarizes the continuous use temperatures of the different polymers mentioned above.

However, fluoropolymers as a class are much more difficult to extrude compared to the usual thermoplastic polymers, because the melt viscosity of most fluoropolymers is greater, resulting in slower rates of production. In addition, the extrusion processing temperatures of fluoropolymers are much higher than most commercial thermoplastics, which can cause some fluoropolymer degradation as a result.

The degradation products include hydrogen fluoride and other fluorine-containing gases which, besides being highly toxic, are extremely corrosive to the usual metals comprising extruder components (e.g., alloy steel, stainless steel) and so require the use of more exotic metals and alloys, such as high nickel content alloys that are capable of resisting corrosion in this hot, acidic environment.

Standard grades of FEP (and also PFA) include those containing only virgin polymer, as well as grades incorporating some level of reprocessed (recycled) material. Although standard grades of FEP and PFA maintain a high degree of purity and function well in most laboratory distillation applications by virtue of the inherent inertness and chemical resistance of fluoropolymers, some applications require an extreme performance level, such as those encountered in the semiconductor fabrication or pharmaceutical manufacturing and processing industries.

In the semiconductor fabrication industry, for example, the latest microelectronic chips and devices feature circuit components that are becoming increasingly smaller in size to allow more circuit components to be crowded onto smaller, more compact chips.

As a result of the smaller sized circuit components, even very low levels of extractable impurities (such as ions, metals and particles of organic carbon) released from standard grades of fluoropolymers can short-circuit, corrode or otherwise alter the performance of semiconductor chips. These contaminants can therefore cause device failure if in contact with the increasingly smaller components and circuit paths of the new microelectronic chips and devices.

Ultra-high purity ("UHP") PFA has been developed to meet the increasing demands of various industries for extreme purity. UHP PFA is made from 100% virgin resin having the highest average molecular weight and resultant highest thermal stability and resistance to thermal degradation over an extended time period, compared to lower average molecular weight grades of PFA that thermally decompose more easily.

The recommended limits and tests for extractable impurities mentioned above are established by the Semiconductor Equipment and Materials International (SEMI) organization, in the F57-0314 standard titled "Provisional Specification for Polymer Materials and Components Used In Ultrapure Water and Liquid Chemical Distribution Systems", a part of the International Standards Program.

In addition to having the highest average molecular weight and thermal stability, UHP PFA, compared to standard grades of fluoropolymers, releases only the very lowest levels of Total Organic Carbon (TOC) ionic impurities and metallic impurities. For example, UHP PFA contains only 0.2% of the limit specified in SEMI F57 for surface extractable Total Organic Carbon (TOC) thereby far exceeding the requirements of the standard.

Amounts of surface ionic contamination of UHP PFA by anions such as bromide, chloride, nitrate, nitrite, phosphate and sulfate are each below the respective reporting limit, which are all much less than the SEMI F57 limits for surface extractable ionic contaminants. Only fluoride levels in UHP PFA exceed the reporting limit, but still remain very low, at 1% of the SEMI F57 limit.

Extractable levels of metallic contamination (e.g., resulting from entrapped metal-containing polymerization catalysts used for the fluoropolymer resin manufacture, or erosion of metallic extruder components) from UHP PFA are also extremely low, not only by pure water extraction, but also by the much more aggressive extraction tests with 35% hydrochloric acid solution, which is commonly encountered in the semiconductor fabrication industry. All common metallic elements, except nickel, were detected at levels below the reporting limits, which are much below the SEMI F57 limits. Nickel concentrations were detected within an acceptable limit as specified in the SEMI F57 standard.

The body 110 of the column packing 100 may be manufactured through a hot-melt extrusion manufacturing process (also referred to as an "extrusion" process). According to the present invention, the polymeric material may be processed in an extruder at an elevated temperature and extruded through a die-head. Non-limiting examples of elevated temperature for extrusion may range from about 190° C. to about 290° C. —including all temperature and sub-ranges there-between. In a non-limiting example, PFA may be extruded at an elevated temperature of about 260° C. In a non-limiting example, FEP may be extruded at an elevated temperature of about 200° C.

The die-head may comprise an opening that forms the corresponding cross-sectional geometry of the body 110. Upon extrusion, the a continuous strand of the column packing 10 may be formed, whereby the strand can then be cut to any desired length on the extrusion line. Alternatively, the strand may be coiled and stored, to be cut to any future length as needed.

The extrusion process can produce a continuous tube or strand of extrudate having a simple round, tubular cross-sectional shape (or profile) to progressively more complex profiles incorporating multiple elements, internal passages (or lumens) and shapes contained within a single outer shape. The outer shape of the extrudate is usually circular in cross section, but can also be square, rectangular or triangular, as well as more complex polygonal outer shapes such as a hexagon. According to the present invention, having the body 110 of the column packing 100 formed of polymeric material and being able to manufacture via extrusion provides the ability to generate the complex multi-channel shapes and profiles that are not as readily accomplished with other materials such as glass or metals.

In other embodiments, the column packing 100 may be fabricated using other processes, such as the injection of low pressure air into the interior of the molten extrudate, or vacuum sizing the molten extrudate as it enters into the cooling water tank, can be used to impart additional precision and control to shape the finished profile.

Figure 7:
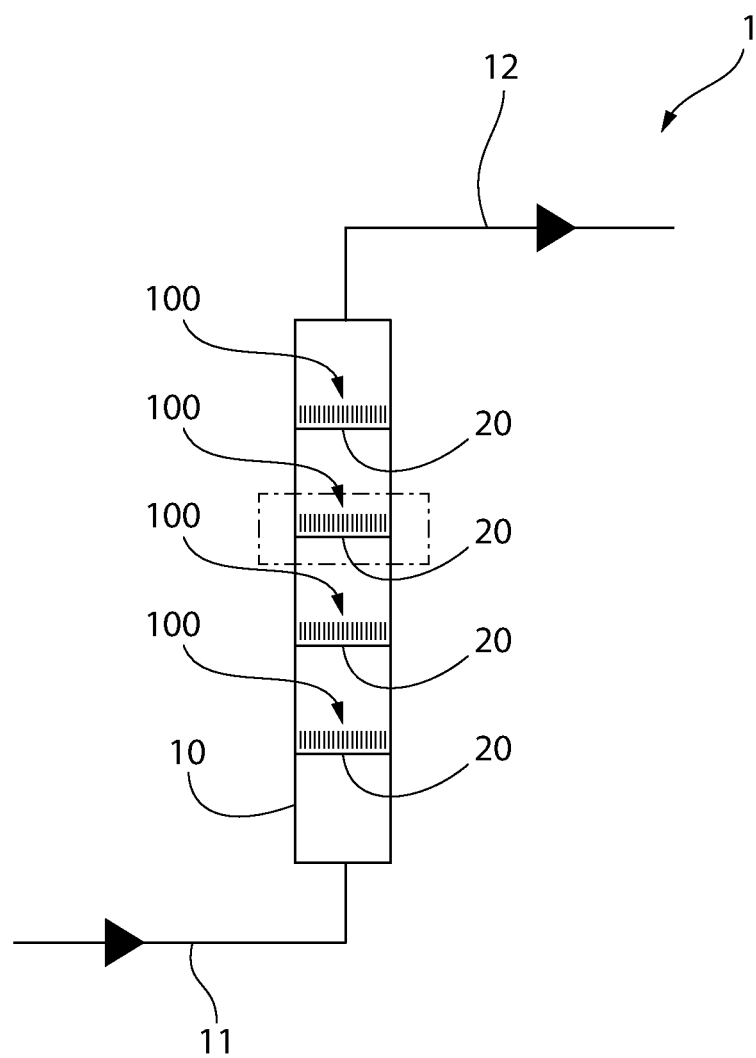
FIG. 7 is a schematic representation of a distillation apparatus comprising the multi-channel distillation column of the present invention.
Figure 8:
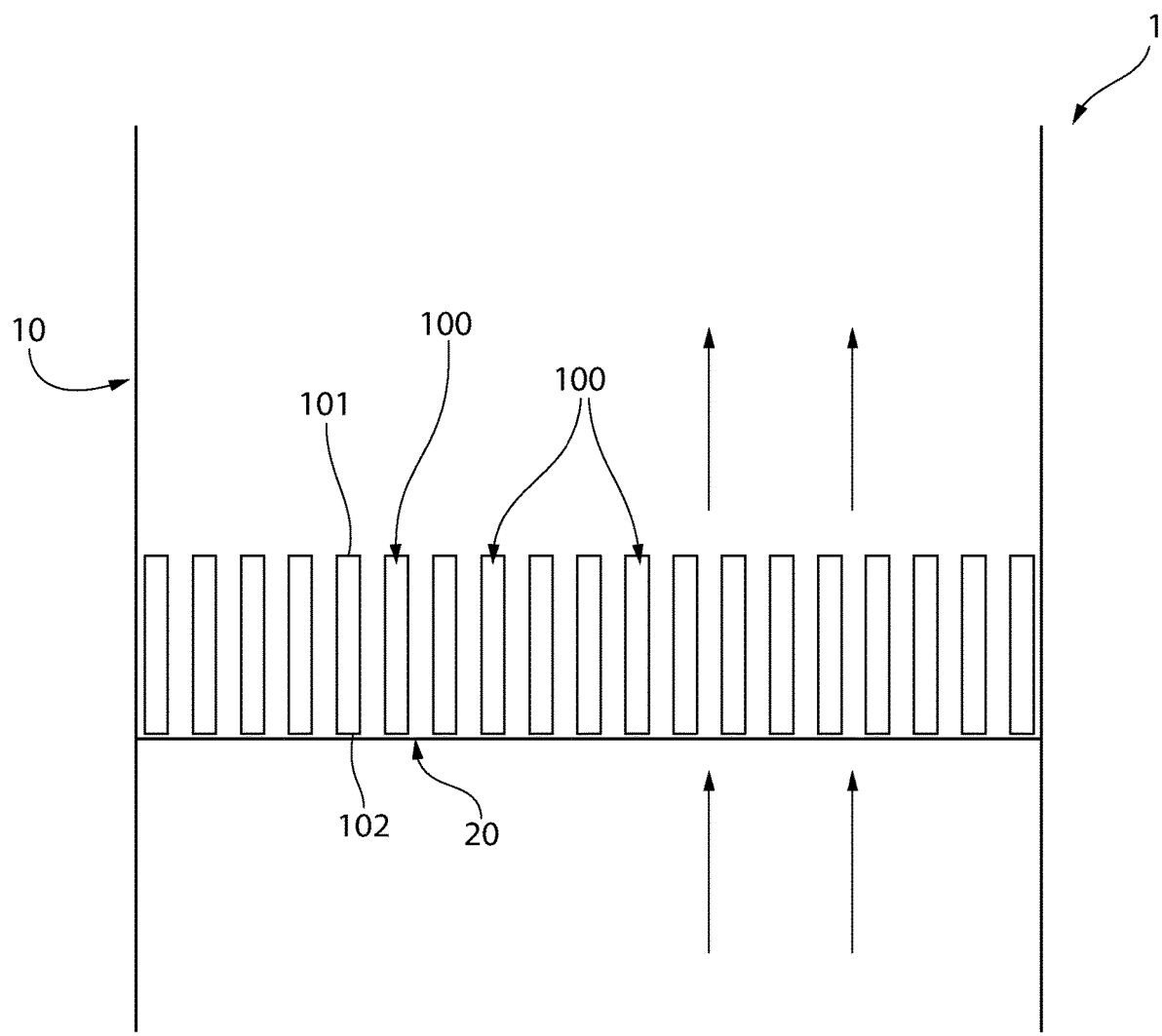
FIG. 8 is a close-up view of the distillation apparatus of FIG. 7 in region XX.

Referring now to FIGS. 7 and 8, the present invention includes a distillation apparatus 1 comprising at least one column packing 100. The distillation apparatus 1 may comprise a plurality of the column packings 100 supported by one or more supports 20. The supports 20 may be porous as to allow for vapor and/or gas to readily pass through. During distillation, a composition may be passed through the distillation chamber 10, thereby that are located inside of the distillation chamber 10. The supports 20 may be a perforated layer. The distillation apparatus 1 may further comprise one or more of the column packings 100—preferably a plurality of the column packings 100. For the distillation apparatus 1 comprising a multiple supports 20, a plurality of the column packings 100 may be located on the multiple supports 20 inside of the distillation chamber 10.

The inlet 11 of the distillation chamber 10 may be fluidly coupled to a first reservoir and the outlet 12 of the distillation chamber 10 may be fluidly coupled to a second reservoir. The first reservoir may contain a composition that is delivered to the distillation chamber 10 via the inlet 11, whereby the composition is subjected to distillation—as discussed in further detail herein. After distillation, the distilled composition may exit the distillation chamber 10 and be delivered to the second reservoir via the outlet 12.

Figure 9:
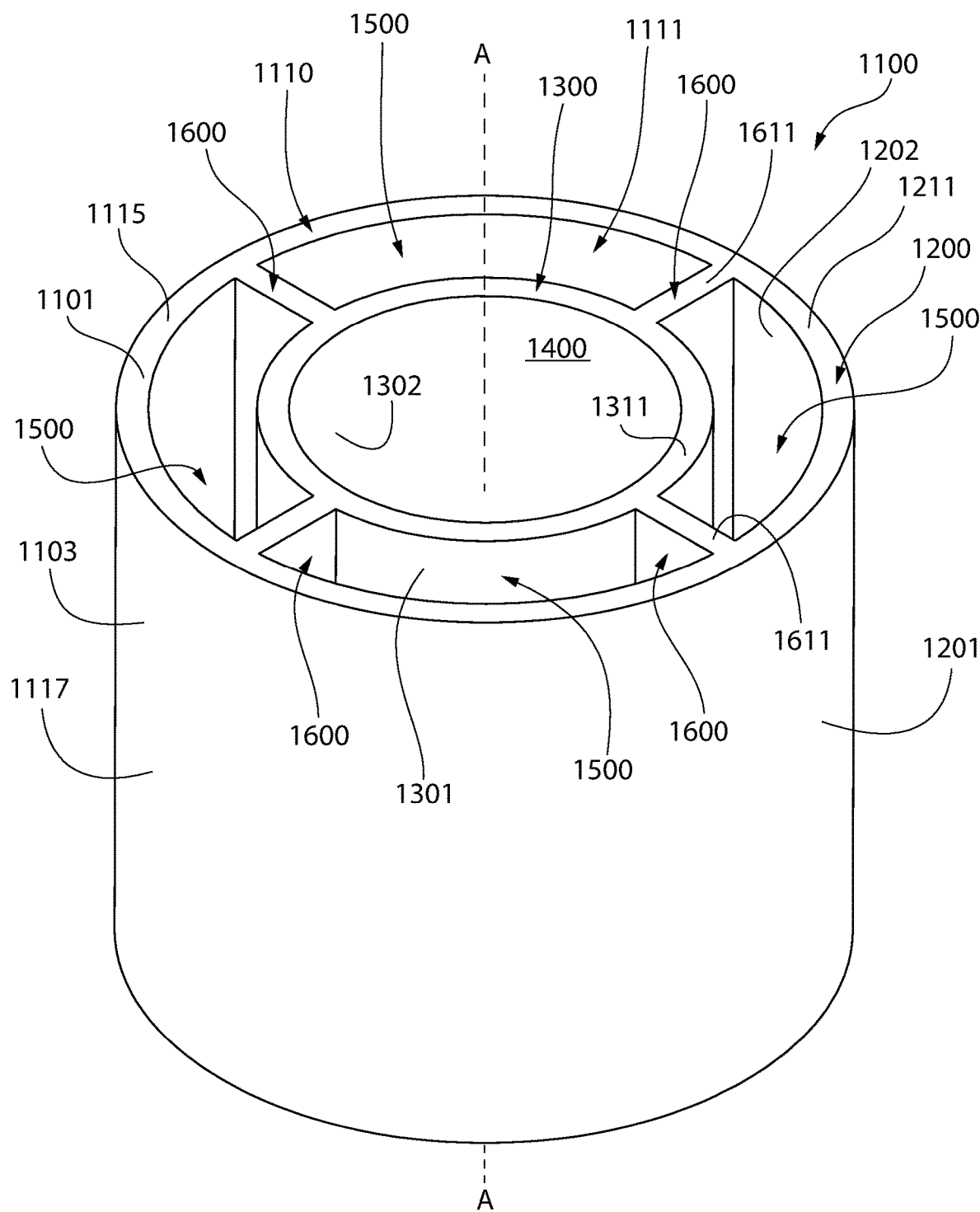
FIG. 9 is a top perspective view of a multi-channel distillation column according to another embodiment of the present invention.
Figure 10:
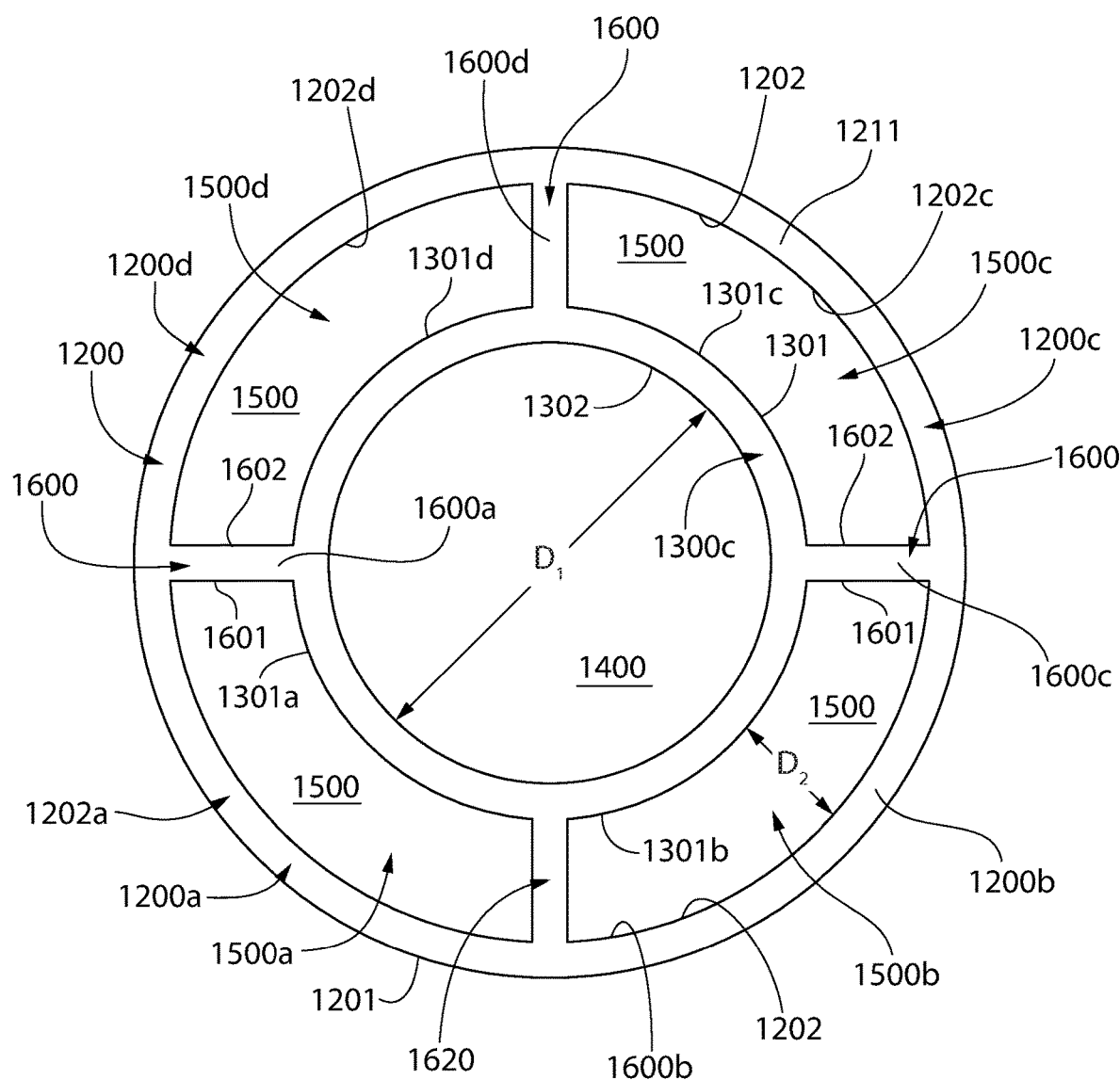
FIG. 10 is a top view of the multi-channel distillation column of FIG. 9.

Referring now to FIGS. 9 and 10, a column packing 1100 is illustrated in accordance with another embodiment of the present invention. The column packing 1100 is similar to the column packing 100 except as described herein below. The description of the column packing 100 above generally applies to the column packing 1100 described below except with regard to the differences specifically noted below. A similar numbering scheme will be used for the column packing 1100 as with the column packing 100 except that the 1000-series of numbers will be used.

The column packing 1100 comprises a body 1110 having a central channel 1400 and a plurality of perimeter channels 1500 that include a first perimeter channel 1500*a*, a second perimeter channel 1500*b*, a third perimeter channel 1500*c*, and a fourth perimeter channel 1500*d*. The four perimeter channels 1500*a*, 1500*b*, 1500*c*, 1500*d*, may be arranged concentrically about the central axis A-A and all have the same cross-sectional shape.

Each of the perimeter channels 1500*a*, 1500*b*, 1500*c*, 1500*d*, may comprise an inner boundary formed by a portion of the outer surface 1301 of the inner wall 1300, an outer boundary formed by a portion of the inner surface 1202 of the outer wall 1200, and a side boundary formed by a first major surface 1601 of a first rib element 1600 and a second major surface of a second rib element 1600. The portion of the outer surface 1301 of the inner wall 1300, the portion of the inner surface 1202 of the outer wall 1200, the first major surface 1601 of the first rib element 1600, and the second major surface of the second rib element 1600 may intersect each other to collectively form a closed perimeter defining the respective perimeter channels 1500*a*, 1500*b*, 1500*c*, 1500*d*.

According to this embodiment, each of the first, second, third, and fourth portions of the outer surfaces 1301*a*, 1301*b*, 1301*c*, 1301*d* of the inner wall 1300 may be curved—specifically, have a uniform radius of curvature as measured from the central axis A-A. Therefore, the respective inner boundaries of the first, second, third, and fourth respective perimeter channels 1500*a*, 1500*b*, 1500*c*, 1500*d* may be curved and have a uniform radius of curvature as measured from the central axis A-A. According to this embodiment, each of the first, second, third, and fourth portions of the inner surfaces 1202*a*, 1202*b*, 1202*c*, 1202*d* of the outer wall 1200 may be curved—specifically, have a uniform radius of curvature as measured from the central axis A-A. Therefore, the respective outer boundaries of the first, second, third, and fourth respective perimeter channels 1500*a*, 1500*b*, 1500*c*, 1500*d* may be curved and have a uniform radius of curvature as measured from the central axis A-A.

Figure 11:
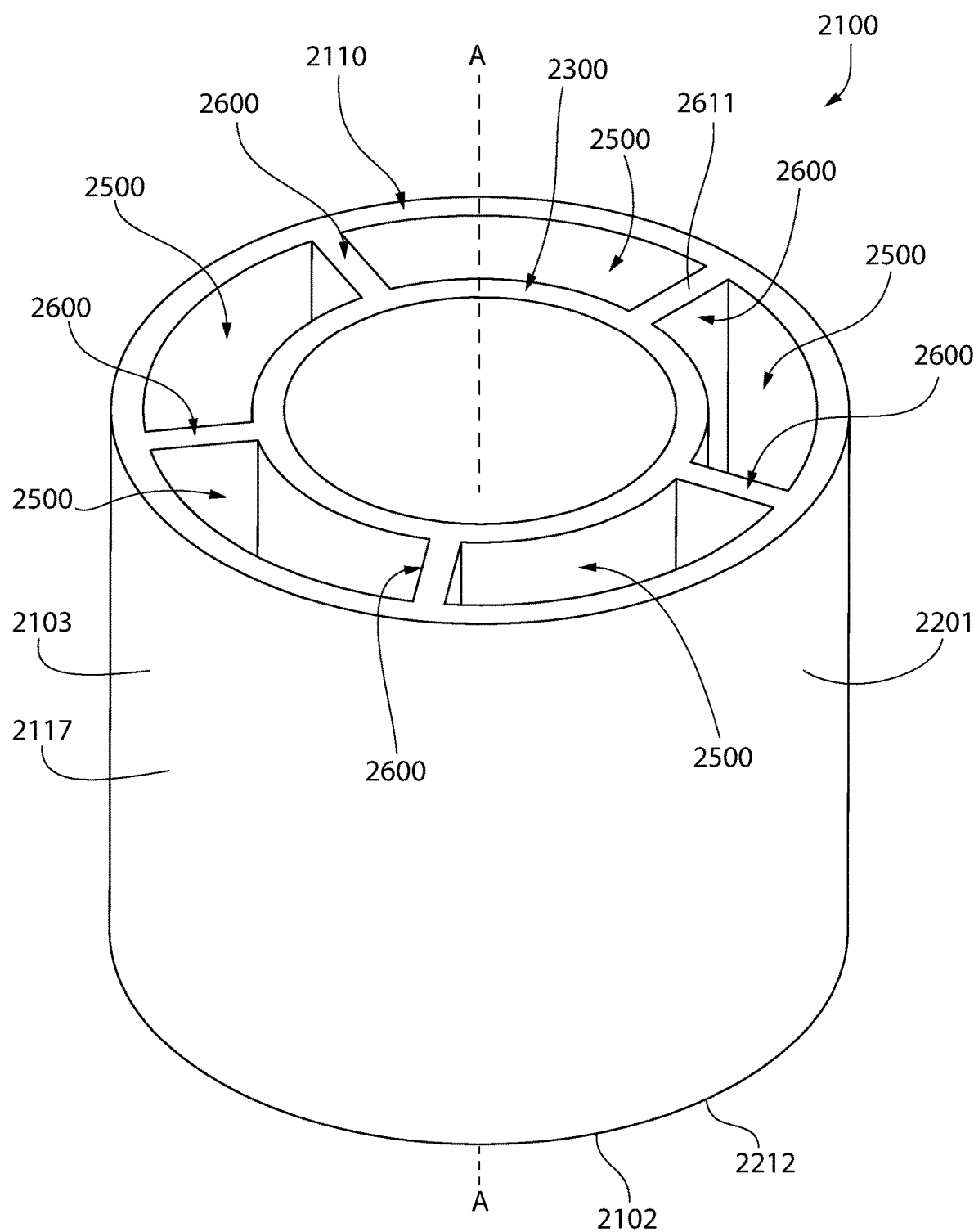
FIG. 11 is a top perspective view of a multi-channel distillation column according to another embodiment of the present invention.
Figure 12:
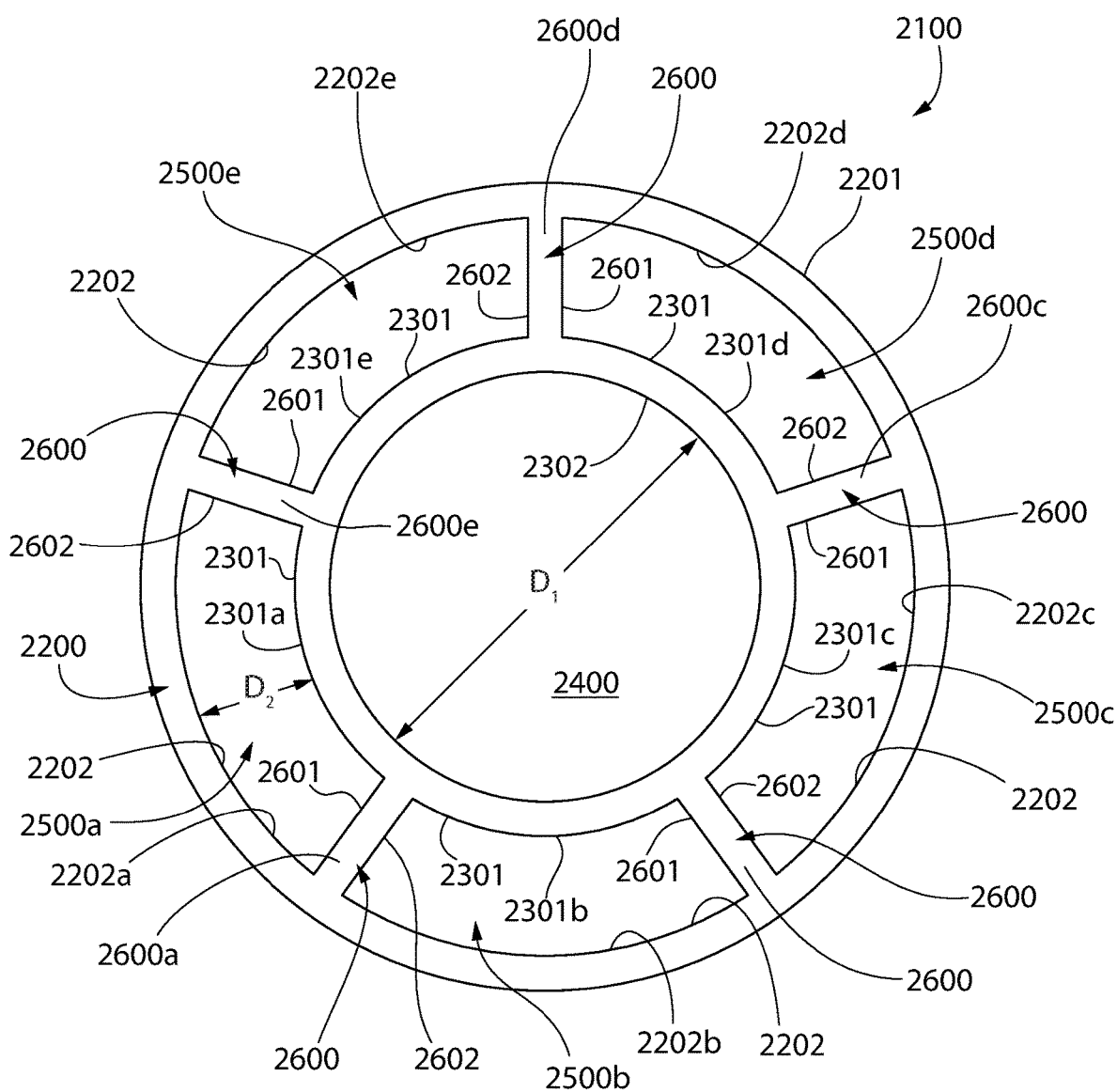
FIG. 12 is a top view of the multi-channel distillation column of FIG. 11.

Referring now to FIGS. 11 and 122, a column packing 2100 is illustrated in accordance with another embodiment of the present invention. The column packing 2100 is similar to the column packing 100 except as described herein below. The description of the column packing 100 above generally applies to the column packing 2100 described below except with regard to the differences specifically noted below. A similar numbering scheme will be used for the column packing 2100 as with the column packing 100 except that the 1000-series of numbers will be used.

Each of the perimeter channels 500*a*, 500*b*, 500*c*, 500*d*, may comprise an inner boundary formed by a portion of the outer surface 301 of the inner wall 300, an outer boundary formed by a portion of the inner surface 202 of the outer wall 200, and a side boundary formed by a first major surface 601 of a first rib element 600 and a second major surface of a second rib element 600. The portion of the outer surface 301 of the inner wall 300, the portion of the inner surface 202 of the outer wall 200, the first major surface 601 of the first rib element 600, and the second major surface of the second rib element 600 may intersect each other to collectively form a closed perimeter defining the respective perimeter channels 500*a*, 500*b*, 500*c*, 500*d*.

Specifically, a first perimeter channel 500*a* may comprise an inner boundary formed by a first portion of the outer surface 301*a* of the inner wall 300 that intersects a first side boundary formed by a second major surface 602 of a first rib element 600*a*, which intersects an outer boundary formed by a first portion of the inner surface 202*a* of the outer wall 200, which intersects a second side boundary formed by a first major surface 601 of a second rib element 600*b*, which intersects the inner boundary formed by the first portion of the outer surface 301*a* of the inner wall 300—thereby collectively forming a closed perimeter that defines the first perimeter channel 500*a*.

A second perimeter channel 500*b* may comprise an inner boundary formed by a second portion of the outer surface 301*b* of the inner wall 300 that intersects a first side boundary formed by a second major surface 602 of the second rib element 600*b*, which intersects an outer boundary formed by a second portion of the inner surface 202*b* of the outer wall 200, which intersects a second side boundary formed by a first major surface 601 of a third rib element 600*c*, which intersects the inner boundary formed by the second portion of the outer surface 301*b* of the inner wall 300—thereby collectively forming a closed perimeter that defines the second perimeter channel 500*b*.

A third perimeter channel 500*c* may comprise an inner boundary formed by a third portion of the outer surface 301*c* of the inner wall 300 that intersects a first side boundary formed by a second major surface 602 of the third rib element 600*c*, which intersects an outer boundary formed by a third portion of the inner surface 202*c* of the outer wall 200, which intersects a second side boundary formed by a first major surface 601 of a fourth rib element 600*d*, which intersects the inner boundary formed by the third portion of the outer surface 301*c* of the inner wall 300—thereby collectively forming a closed perimeter that defines the third perimeter channel 500*c*.

A fourth perimeter channel 500*d* may comprise an inner boundary formed by a fourth portion of the outer surface 301*d* of the inner wall 300 that intersects a first side boundary formed by a second major surface 602 of the fourth rib element 600*d*, which intersects an outer boundary formed by a fourth portion of the inner surface 202*d* of the outer wall 200, which intersects a second side boundary formed by a first major surface 601 of a first rib element 600*a*, which intersects the inner boundary formed by the fourth portion of the outer surface 301*d* of the inner wall 300—thereby collectively forming a closed perimeter that defines the fourth perimeter channel 500*d*.

According to this embodiment, each of the first, second, third, and fourth portions of the outer surfaces 301*a*, 301*b*, 301*c*, 301*d* of the inner wall 300 may be planar. Therefore, the respective inner boundaries of the first, second, third, and fourth respective perimeter channels 500*a*, 500*b*, 500*c*, 500*d* may be flat (i.e., planar). According to this embodiment, each of the first, second, third, and fourth portions of the inner surfaces 202*a*, 202*b*, 202*c*, 202*d* of the outer wall 200 may be curved—specifically, have a uniform radius of curvature as measured from the central axis A-A. Therefore, the respective outer boundaries of the first, second, third, and fourth respective perimeter channels 500*a*, 500*b*, 500*c*, 500*d* may be curved and have a uniform radius of curvature as measured from the central axis A-A. According to this embodiment, each of first and second major surfaces 601, 602, of the first, second, third, and fourth rib elements 600*a*, 600*b*, 600*c*, 600*d* may be planar—i.e., flat. Therefore, the respective first and second side boundaries of the first, second, third, and fourth respective perimeter channels 500*a*, 500*b*, 500*c*, 500*d* may be planar—i.e., flat.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

EXAMPLES

Table 1 lists some commercially available column packings made from a variety of classic materials that exhibit excellent chemical resistance, stability and purity, but suffer from reduced surface area due to the limited capability of the available manufacturing methods compared to polymer extrusion.

TABLE 1

| Packing Type | Surface Area per Piece, mm² (similar sizes occupy same overall volume per piece) |
|---|---|
| 5 mm diameter glass beads (spheres) | 79 |
| 8 mm diameter glass beads (spheres) | 201 |
| Raschig Rings, glass, 5 mm OD X 5 mm long (simple cylinders with 0.5 mm wall thickness) | 141 |
| Raschig Rings, glass, 8 mm OD X 8 mm long (simple cylinders with 0.5 mm wall thickness) | 377 |
| Thin sheet metal plates, 316 stainless steel, 5 mm × 5 mm square pieces formed into curved shape | 50 |
| Thin sheet metal plates, 316 stainless steel, 8 mm × 8 mm square pieces formed into curved shape | 128 |
| MCD-5, FEP or PFA fluoropolymer 5 mm OD X 5 mm long | 592 |
| MCD-8, FEP or PFA fluoropolymer 8 mm OD X 8 mm long | 309 |

Table 2 lists some of the MCD column packing sizes with respective data for each.

TABLE 2

| Item No. | Common Unit of Comparison | Approximate Volume per 250 g | Approx. Number of Pieces per 250 g | Approx. Surface Area per 250 g |
|---|---|---|---|---|
| MCD-5 | 250 g | 500 cm³ | 2200 | 6800 cm² |
| MCD-8 | 250 g | 600 cm³ | 1140 | 6750 cm² |
| MCD-10 | 250 g | 1100 cm³ | 1000 | 10,600 cm² |

In addition to extreme chemical resistance, fluoropolymers also withstand much higher continuous use service temperatures than the much more inexpensive and commonly used thermoplastic polymers noted previously. Table 3 summarizes the continuous use temperatures of the different polymers mentioned above.

TABLE 3

| Polymer | FEP | PFA all grades | PVDF | ETFE | LDPE | HDPE | PP | PVC |
|---|---|---|---|---|---|---|---|---|
| Maximum Continuous Use Temperature | 200° C. 392° F. | 260° C. 500° F. | 129° C. 265° F. | 150° C. 302° F. | 79° C. 175° F. | 102° C. 215° F. | 121° C. 250° F. | 177° C. 350° F. |

What is claimed:

1. A column packing for a distillation apparatus, the column packing comprising:
   a first open end opposite a second open end;
   a central channel;
   a plurality of perimeter channels; and
   a body extending along a central axis between an upper end opposite a lower end, the body formed of polymeric material and comprising:
      an outer wall extending substantially parallel to the central axis between the first and second open ends of the body, the outer wall having an outer surface opposite an inner surface;
      an inner wall circumscribed by the outer wall and extending substantially parallel to the central axis between the first and second open ends of the body, the inner wall comprising an outer surface opposite an inner surface; and
      a plurality of rib elements connecting the inner wall to the outer wall, each of the rib elements comprise a first major surface opposite a second major surface and each of the rib elements extending substantially parallel to the central axis between the first and second open ends of the body;
   wherein the central axis intersects both the first and second open ends, the central channel extending parallel to the central axis and the central channel circumscribed by the inner wall; and the plurality of perimeter channels extending parallel to the central axis, each of the plurality of perimeter channels defined by at least a portion of the inner wall, at least a portion of the outer wall, and at least two the plurality of rib elements;
   wherein the central channel has a width as measured between opposite inner surfaces of the inner wall, the width ranging from about 1.5 mm to about 2.3 mm;
   wherein the outer surface of the inner wall and adjacent the inner surface of the outer wall offset by a maximum distance ranging from about 1.0 mm to about 1.3 mm; and
   wherein the polymeric material is ultra-high purity perfluoroalkoxy alkane polymer containing up to 0.2% of the limit specified in SEMI F57 for surface extractable Total Organic Carbon.

2. The column packing according to claim 1, wherein the central channel is concentric with the central axis.

3. The column packing according to claim 1, wherein the plurality of perimeter channels are arranged concentrically about the central axis.

4. The column packing according to claim 1, wherein the outer wall extends continuously between the first and second open ends of the body.

5. The column packing according to claim 1, wherein the inner wall extends continuously between the first and second open ends of the body.

6. The column packing according to claim 1, wherein the central channel has a circular cross-sectional shape taken in a direction normal to the central axis.

7. The column packing according to claim 1, wherein the central channel has a polygonal cross-sectional shape taken in a direction normal to the central axis.

8. The column packing according to claim 1, wherein the outer wall is cylindrical; and
   wherein each of the perimeter channels are formed by a portion of the inner surface of the outer wall; the outer surface of the inner wall, the first major surface of a first rib element, and the second major surface of a second rib element.

9. The column packing according to claim 8, wherein the body has a first diameter as measured from the outer surface, the diameter ranging from about 1 mm to about 10 mm.

10. The column packing according to claim 9, wherein the body has a height as measured between the upper end and the lower end, and a ratio of the diameter to the height of the body ranges from about 0.33:1 to about 3:1.

11. A column packing for a distillation apparatus, the column packing having an upper end opposite a lower end, the column packing comprising:
- a body extending along a central axis, the body comprising:
  - an outer wall extending parallel to the central axis between the upper end and the lower end, the outer wall circumscrbing the central axis;
  - a central channel extending parallel to the central axis, the central channel comprising a first open end opposite a second open end, the central channel having a width ranging from about 1.5 mm to about 2.3 mm;
  - a plurality of perimeter channels circumscribing the central channel, each of the perimeter channels comprising a first open end opposite a second open end;
  - a plurality of rib elements connecting the central channel to the outerwall, each of the rib elements comprise a first major surface opposite a second major surface that extend substantially parallel to the central axis between the upper end and the lower end; and
- wherein the multi-channel body is formed of ultra-high purity perfluoroalkoxy alkane polymer containing up to 0.2% of the limit specified in SEMI F57 for surface extractable Total Organic Carbon; and
- wherein the outer wall extends continuously between the upper end and the lower end and extends continuously about the central axis.

12. The column packing according to claim 11, wherein first open end of the central channel and the first open end of each of the perimeter channels overlap with the upper end of the column packing, and wherein second open end of the central channel and the second open end of each of the perimeter channels overlap with the lower end of the column packing.

13. The column packing according to claim 11, wherein the body has a height as measured between first and second open ends of the central channel and plurality of perimeter channels, and the body has a diameter as measured from an outermost surface of the body,
- wherein the ratio of the diameter to the height of the body ranges from about 0.33:1 to about 3:1.

14. A column packing for a distillation apparatus, the column packing comprising:
- a first open end opposite a second open end:
- a central channel;
- a plurality of perimeter channels; and
- a body extending along a central axis between an upper end opposite a lower end, the body formed of ultra-high purity fluoropolymer and comprising:
  - an outer wall extending substantially parallel to the central axis between the first and second open ends of the body;
  - an inner wall circumscribed by the outer wall and extending substantially parallel to the central axis between the first and second open ends of the body; and
  - a plurality of rib elements connecting the inner wall to the outer wall;
- wherein the central axis intersects both the first and second open ends, the central channel extending parallel to the central axis and the central channel circumscribed by the inner wall; and the plurality of perimeter channels extending parallel to the central axis, each of the plurality of perimeter channels defined by at least a portion of the inner wall, at least a portion of the outer wall, and at least two the plurality of rib elements; and
- wherein the ultra-high purity fluoropolymer contains up to 0.2% of the limit specified in SEMI F57 for surface extractable Total Organic Carbon.

15. The column packing of claim 14, wherein the ultra-high purity fluoropoymer is ultra-high purity perfluoroalkoxy alkane polymer.

16. The column packing according to claim 14, wherein the central channel has a width ranging from about 1.5 mm to about 2.3 mm.

* * * * *

UNITED STATES PATENT AND TRADEMARK OFFICE
CERTIFICATE OF CORRECTION

| | | |
|---|---|---|
| PATENT NO. | : 11,358,115 B2 | Page 1 of 1 |
| APPLICATION NO. | : 16/367366 | |
| DATED | : June 14, 2022 | |
| INVENTOR(S) | : Gregory B. Norell | |

It is certified that error appears in the above-identified patent and that said Letters Patent is hereby corrected as shown below:

On the Title Page

Item (71) In applicant, change "Morgantown" to "Morganton."

Signed and Sealed this
Twenty-third Day of July, 2024

Katherine Kelly Vidal
*Director of the United States Patent and Trademark Office*